United States Patent
Plog

(10) Patent No.: US 6,414,724 B1
(45) Date of Patent: Jul. 2, 2002

(54) TELETEXT WITH TRANSPARENT FUNCTION

(75) Inventor: Jürgen Plog, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/299,525

(22) Filed: Apr. 26, 1999

(30) Foreign Application Priority Data

May 2, 1998 (DE) .......................................... 198 19 669

(51) Int. Cl.[7] .................................................. H04N 9/74
(52) U.S. Cl. ........................ 348/589; 348/600; 345/592
(58) Field of Search .............................. 348/586, 589, 348/590, 600, 601, 468; 345/114, 116, 435, 636, 634, 592, 589, 593

(56) References Cited

U.S. PATENT DOCUMENTS 5,254,984 A  * 10/1993 Wakeland ................... 345/144
5,579,057 A  * 11/1996 Banker et al. ............... 348/589
5,907,315 A  *  5/1999 Vlahos et al. ............... 145/114
6,118,427 A  *  9/2000 Buxton et al. ............... 345/113
6,172,717 B1 *  1/2001 Ebihara ....................... 348/586
6,175,663 B1 *  1/2001 Huang ......................... 345/114
6,225,973 B1 *  5/2001 Hill et al. .................... 345/114

* cited by examiner

*Primary Examiner*—Michael H. Lee
(74) *Attorney, Agent, or Firm*—Edward W. Goodman

(57) ABSTRACT

In a method of displaying graphics subdivided into areas with a foreground and a background, each of which is area-wise switchable to a selectable color, and in which graphics areas are transparently switchable to at least a different display plane, bits specially reserved in the memory for the foreground and background transparent switching can be saved in that a foreground color selected in the area and a background color selected in the area are compared area-wise, and in that those areas of the foreground and/or the background of the graphics are transparently switched in which a predetermined constellation of the selected foreground color and the selected background color is determined.

10 Claims, 1 Drawing Sheet

TELETEXT WITH TRANSPARENT FUNCTION

BACKGROUND OF THE INVENTION

1. Field of The Invention

The invention relates to a method of displaying graphics subdivided into areas with a foreground and a background, each of which is area-wise switchable to a selectable color, and in which graphics areas are transparently switchable to at least a different display plane.

2. Description of The Related Art

Such graphics displays are particularly used for teletext in television apparatuses. The teletext has a foreground which mostly consists of displayed characters or other graphics. The background is usually a colored area which may also have different colors in different parts of this area. Moreover, it is known for such teletext displays to be able to transparently switch the foreground and/or the background. This means that in the respective transparently switched areas of the foreground and/or the background, it is not this foreground or background which is displayed but a different display plane. This different display plane may be, for example a video image which becomes visible in the transparently switched areas.

In the method of transparent switching known in the state of the art, additional bits are stored as transparent bits in the display memory. It is also possible to use a specific color which is stored in the display memory for the transparent switching. In both cases, additional memory sites are required, which are reserved for the transparent switching. Either attribute bits are reserved for the transparent display in the display memory, or memory sites are reserved in a color memory, these sites being assigned to the color at which transparent switching should actually take place.

SUMMARY OF THE INVENTION

It is an object of the invention to provide a method of transparent switching in such graphic applications, in which no additional memory space is required for the transparent switching.

According to the invention, this object is achieved in that a foreground color selected in an area and a background color selected in the same area are compared area-wise, and in that those areas of the foreground and/or the background of the graphics are transparently switched in which a predetermined constellation of the selected foreground color and the selected background color is determined.

In the method according to the invention, no additional memory space is required for the transparent switching of corresponding areas of a foreground and/or a background of a graphics display, because no additional bits or no specific colors are used for the transparent switching. Instead, the constellation of the selected foreground color and the selected background color is accentuated. Given combinations of foreground color and background color may be predetermined, at whose occurrence the corresponding areas are switched transparently. Advantageously, constellations of foreground color and background color which do not occur anyway or are not useful, i.e., constellations not used for the normal graphics display, may be selected for this purpose. This comparison is made individually for the separate areas of the graphics display so that transparent switching takes place or does not take place area-wise.

It is thereby achieved that memory bits which are necessary anyway for the colors of the foreground and/or the background, can be additionally used for the transparent switching.

The embodiment according to the invention, wherein those areas of the foreground and/or the background of the graphics are switched transparently in which the same color is selected for the foreground and the background, utilizes the fact that an identical foreground and background color in the graphics display or a teletext display would not be recognizable anyway and utilizes this constellation for transparent switching. For the graphics display, there is no limitation of possible combinations of foreground and background colors because graphics with identical foreground and background colors cannot be recognized anyway.

The further embodiment according to the invention, wherein changes of the selected foreground color and the selected background color between a first area and a neighboring, second area are determined, and in that, dependent on the foreground and background colors selected for the first area and on the changes of the selected colors between the second and the first area a decision is made on whether the foreground or the background is switched transparently, further improves the method to the extent that the constellation of foreground and background color is not only tested statically in the separate areas, but the change of foreground and background colors from a second area to a first area is also tested. Dependent on the change of the foreground and background colors from the second area to the first area, a decision can be made on whether only the foreground, only the background, both or none of the two are switched transparently. Thus, the change of the foreground and background colors is taken into account as an additional criterion for the transparent switching, with a decision being possible for the foreground and the background individually.

Further embodiments of the method describe advantageous constellations for the transparent switching, with the change of selected foreground and/or background color being taken into account for the decision.

In a further embodiment according to the invention, wherein the graphics are videotext for whose symbols foreground colors are selectable, the videotext symbols being displayable on a background whose color is selectable as a background color, and in that a picture signal is displayable on the other display plane, the method according to the invention may be particularly used advantageously for teletext in which it is generally desired to implement a transparent function which can be realized in accordance with the invention without any additional memory space.

These and other aspects of the invention will be apparent from and elucidated with reference to the embodiments described hereinafter.

DESCRIPTION OF THE PREFERRED EMBODIMENTS

Figure 1:
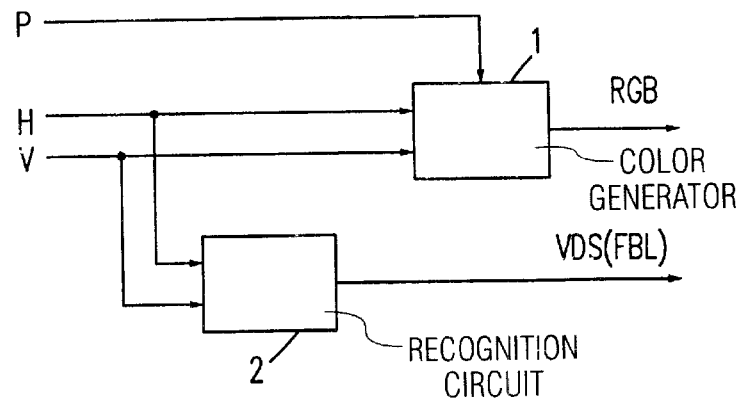
FIG. 1. is a block diagram of a circuit arrangement operating in accordance with the method according to the invention.

The block diagram of FIG. 1 shows a circuit arrangement 1 for color generation. This circuit arrangement is used to generate the actual color display for a graphics display with a foreground and a background.

A foreground color V and a background color H are applied area-wise to the circuit arrangement 1, for example, from a memory (not shown). These are corresponding bits which signalize the selected colors area-wise.

The circuit arrangement 1 for color generation further receives a switching signal P, in dependence upon which the circuit arrangement switches area-wise between the foreground color and the background color. Thus, it is area-wise selected whether the foreground or the background is to be displayed. The size of the areas in which it is possible to switch between foreground and background color can be chosen to be arbitrarily small, down to pixel size.

The circuit arrangement 1 supplies a graphics signal from its output which, in this embodiment, is composed of three primary colors red, green and blue which can be displayed on a display screen. The displayed graphics comprise foreground elements and background elements. In a teletext display, the foreground elements are, for example, characters or other graphic elements, whereas the background colors generally constitute a plane background of possibly changing colors.

It is often desirable to integrate a transparent function in such a teletext display. This allows, for example, area-wise or total transparent switching of the foreground and/or the background. The transparent-switched areas of the graphics are not. displayed; instead, a different display plane is displayed in these areas, for example, a picture signal.

In the prior-art method, special additional bits are required in the signals H and V to signalize the transparent switching. This is to be obviated by means of the method according to the invention.

To this end, a recognition circuit 2 is provided which receives the signals H and V signalizing the selected foreground and background colors. The recognition circuit 2 supplies a VDS-characterized signal which, in a subsequent circuit (not shown), switches between the output signal of the color generation circuit 1 and a picture signal. This results in an area-wise switching from the graphics to a picture signal, and conversely, while those areas switched to the picture signal represent the transparent-switched areas.

In the simplest case, the recognition circuit may perform a simple comparison between the foreground color and the background color. When certain fixed constellations occur between the selected foreground color and the selected background color, which signalize areas to be transparent-switched, the recognition circuit 2 supplies the signal VDS so that there is a switch-over from the graphics to the picture display in these areas, i.e., the graphics is transparent-switched in these areas.

The recognition circuit may, for example, test the identity of the foreground color and the background color and, in the case of identity, supply the signal VDS for transparent switching or switching to a different display plane for the corresponding areas in which this identity occurs.

Moreover, certain foreground and background color transitions between neighboring areas may be evaluated. For example, in a first area, in which it is to be decided whether this area is transparent-switched or not, not only the foreground and background color of this area are evaluated but also the colors of a neighboring, second area. The color transition between this second area and the first area, for which the decision for transparent switching is to be made, may be evaluated additionally. Moreover, also in this test of the color transitions, a determination of the colors in the first areas will also be included in the decision.

The fact that the color transitions between neighboring areas are taken into account also allows making a decision on whether only the foreground, only the background, both or none of the two is switched transparently.

The decision about the transparent switching may be, for example, such that a foreground color, which had a different color in the second area than the background of this area, is to be switched transparently in the first area only when it is identical in the first area to the background color of this area. A corresponding decision criterion may also be used for a background color changing during the transition from the second area to the first area. This also applies when the foreground and background colors change simultaneously during this transition.

Figure 2:
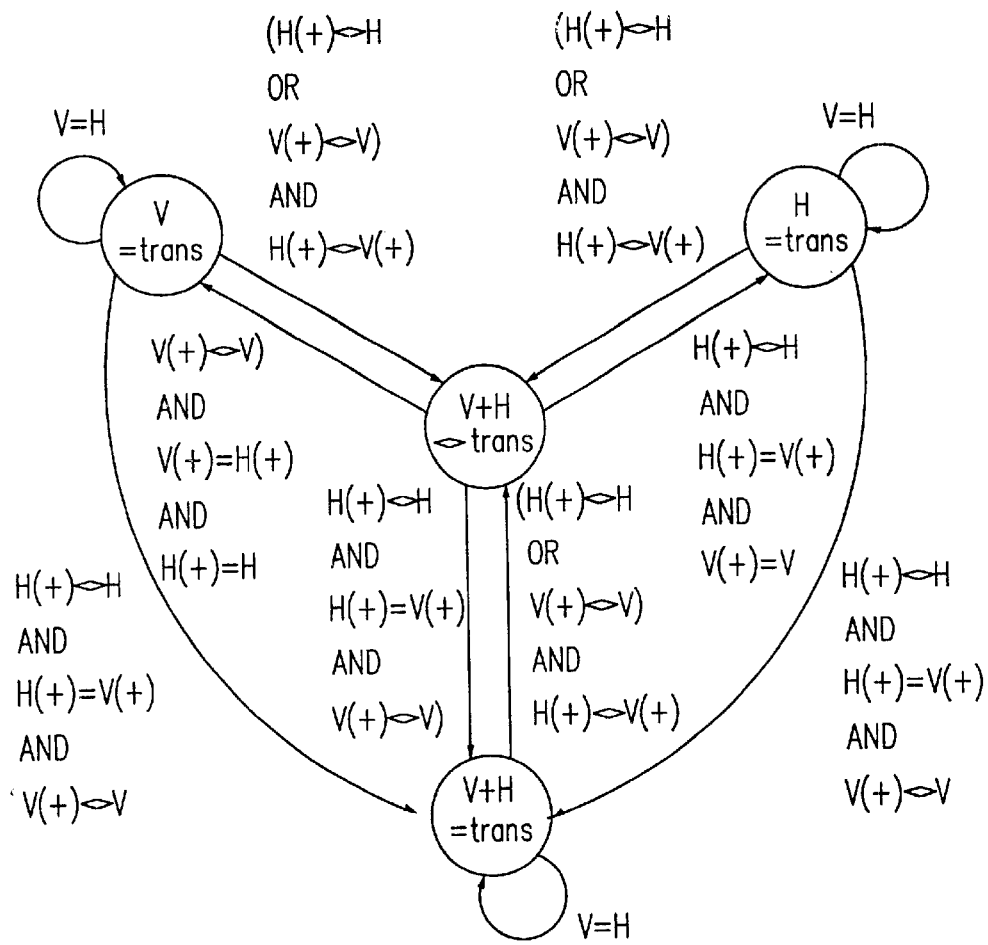
FIG. 2 is a graphic representation of the decision criteria in accordance with which the recognition circuit of the circuit arrangement of FIG. 1 operates.

FIG. 2 shows a diagram symbolizing advantageous decision criteria which apply to color transitions of foreground and background colors from the second area to the first area. Moreover, also the colors of the foreground and the background in the first area are evaluated.

In the diagram, the circles indicate a state in which the foreground and/or the background are switched transparently, or in which neither the foreground nor the background are switched transparently. The transitions between the circles are provided with decision criteria at whose occurrence the corresponding transition is selected by the recognition circuit of the circuit arrangement shown in FIG. 1.

The transition from one of the circles to the other corresponds to the above-described transition from a neighboring second area to a first area of the graphics for which the transparent-switching decision is to be made.

The decision criteria in FIG. 2 are shown in such a way that V(+) represents, for example, the foreground color of the first area and V without an extra symbol represents the foreground color of the second area. This also applies to the background colors.

For example, if the second area is displayed as defined by the central circle, neither the foreground color nor the background color are switched transparently in the relevant area, i.e., both foreground color and background color of the graphics are displayed. This display in the second area of the graphics changes to a display of the first area of the graphics for which the background is transparent when the criterion for the relevant case in FIG. 2 is fulfilled. In this example, this criterion is fulfilled when the selected background colors of the second area and the first area are different, when the foreground color in both areas has not changed and when the foreground and the background color in the first area are identical. In other words, this means that only the background color has changed between the second area and the first area and is identical with the foreground color in the first area. In this case, the state symbolized at the top right in the circle would thus be achieved, which means that the background is switched transparently.

Based on the state symbolized by the central circle, in which neither the foreground nor the background is switched transparently, a switch-over then takes place from the state in which the foreground is switched transparently, in accordance with the upper left circle in FIG. 2, when the foreground color has changed from the second area to the first area, the background color has not changed and the foreground color and the background color become identical in the first area.

Furthermore, there would be a switch-over from a display in accordance with what is symbolized by the central circle to a display in which both the foreground and the background are switched transparently when both the foreground and the background change between the second and the first area and are identical in the first area.

Under certain conditions, there would again be a transition from the display in accordance with the lower circle, in which both the foreground and the background are switched transparently, to the display in accordance with the central circle, in which neither the foreground nor the background are switched transparently, when either the background color or the foreground color changes between the two areas and when they become unequal in the first area. However, when the foreground color and the background color remain identical, the transparent display of both areas is maintained.

There is a transition from a display in accordance with the upper left circle, in which the foreground is switched transparently, to the display in accordance with the central circle, in which neither the foreground nor the background are switched transparently when the background color between the two areas has changed or when the foreground color has changed, and when, moreover, both colors are unequal in the first area. However, if the background color and the foreground color have changed between the two areas and, moreover, if they are identical in the first area, there will be a change-over to a display in which the foreground color and the background color are switched transparently. However, when the foreground color and the background color remain identical, the display of the transparent foreground is maintained.

In a corresponding manner, decision criteria are provided which, based on a display with a transparently switched background in accordance with the symbols in the top right circle, apply to a different display. Based on this display, there is a transition to a display in which neither the foreground nor the background are switched transparently when either the foreground color or the background color changes between the areas and when they become identical in the first area. There would be a transition to a display with a transparent foreground and background when the background and foreground colors have changed and become identical. Thus, for the display with a transparent background, the same decision criteria as for the display with the transparent foreground apply to the transitions to the other states.

In these decision criteria, the foreground and background colors of the first area are thus taken into account for the decision. Moreover, the change of colors from the neighboring second area to the first area is taken into account for the decision. Both decision criteria jointly lead finally to the decision whether the foreground and/or the background is to be displayed transparently in the first area.

Basically, a purely static evaluation of given foreground and background colors is already sufficient for transparent switching. In the simplest case, the identity between the foreground and the background color in the first area is checked, and in the case of identity, there is a transparent switch of the foreground and/or the background. Due to the additional criteria evaluating the transitions, a transparent switch of the foreground, the background or both can also be carried out, dependent on whether the foreground color or the background color has changed and a given constellation of both colors is obtained in the first area. Thus, dependent on which of the two colors has changed, a selection can be made whether the foreground or the background is switched transparently.

This provides an extremely flexible switching facility of the transparent function without additional bits in the signals HV and thus additional memory bits being required.

What is claimed is:

1. A method of displaying graphics subdivided into areas with a foreground and a background, each of which is area-wise switchable to a selectable color, and in which graphics areas are transparently switchable to at least a different display plane, characterized in that said method comprises the steps:

area-wise comparing a foreground color selected in an area and a background color selected in the same area; and transparently switching those areas of the foreground and/or the background of the graphics in which a predetermined constellation of the selected foreground color and the selected background color is determined.

2. The method as claimed in claim 1, characterized in that said transparently switching step comprises:

transparently switching those areas of the foreground and/or the background of the graphics in which the same color is selected for the foreground and the background.

3. The method as claimed in claim 1, characterized in that said method further comprises the steps:

determining changes of the selected foreground color and the selected background color between a first area and a neighboring, second area; and deciding, dependent on the foreground and background colors selected for the first area and on the changes of the selected colors between the second and the first area, whether the foreground or the background is to be switched transparently in said transparently switching step.

4. The method as claimed in claim 3, characterized in that said transparently switching step comprises:

transparently switching, in a first area, the foreground when the foreground color selected for this area has changed with respect to the foreground color selected for a neighboring, second area and when it is identical in the first area to the selected background color of this area.

5. The method as claimed in claim 3, characterized in that said transparently switching step comprises:

transparently switching, in a first area, the background when the background color selected for this area has changed with respect to the background color selected for a neighboring, second area and when it is identical in the first area to the selected foreground color of this area.

6. The method as claimed in claim 3, characterized in that said transparently switching step comprises:

transparently switching, in a first area, the foreground and the background when the foreground and background colors selected for these areas have changed with respect to the color selected for a neighboring, second area and when the foreground and background colors selected for the first area are identical.

7. The method as claimed in claim 1, characterized in that the graphics are videotext having symbols with selectable foreground colors, the videotext symbols being displayable on a background having a color selectable as a background color, and in that a picture signal is displayable on the different display plane.

8. A circuit arrangement for displaying graphics subdivided into areas with a foreground and a background, each of which is area-wise switchable to a selectable color, said circuit arrangement comprising means for transparently switching graphics areas to at least a different display plane, characterized in that said circuit arrangement further comprises a recognition circuit for area-wise checking the equality of a foreground color selected in the area and a background color selected in the area, and for transparently switching those areas of the foreground and/or the background of the graphics in which a predetermined constellation of the selected foreground color and the selected background color is determined.

9. The circuit arrangement as claimed in claim 8, characterized in that the recognition circuit transparently switches those areas of the foreground and/or the background of the graphics in which the same color is selected for the foreground and the background.

10. The circuit arrangement as claimed in claim 8, characterized in that the recognition circuit determines changes of the selected foreground color and the selected background color between a first area and a neighboring, second area, and the recognition circuit transparently switches the foreground and/or the background dependent on the foreground and background colors selected for the first area and on the changes of the selected colors between the second and the first area.

* * * * *